United States Patent [19]

Roach

[11] Patent Number: 4,493,214

[45] Date of Patent: Jan. 15, 1985

[54] TRANSDUCERS FOR PROVIDING AN ELECTRICAL SIGNAL REPRESENTATIVE OF PHYSICAL MOVEMENT

[75] Inventor: Peter F. Roach, Croft, England

[73] Assignee: United Kingdom Atomic Energy Authority, London, England

[21] Appl. No.: 433,106

[22] Filed: Oct. 6, 1982

[30] Foreign Application Priority Data

Oct. 8, 1981 [GB] United Kingdom ............... 8130428

[51] Int. Cl.³ .............................................. G01B 7/16
[52] U.S. Cl. ..................................... 73/779; 73/786; 376/249; 336/129
[58] Field of Search ................. 73/775, 779, 786, 783; 376/249; 336/129, 115, 117, 119

[56] References Cited

U.S. PATENT DOCUMENTS 2,836,803  5/1958  White et al. .......................... 73/779
4,096,463  6/1978  Gitzendanner et al. ............ 336/129
4,150,352  4/1979  Pomella et al. ..................... 336/129

FOREIGN PATENT DOCUMENTS 1208791  2/1960  France ............................... 336/119

Primary Examiner—Anthony V. Ciarlante
Attorney, Agent, or Firm—William R. Hinds

[57] ABSTRACT

A transducer, especially suitable for monitoring welds (22), in a sodium-cooled nuclear reactor, has two plates (11, 12) in sliding face contact with parallel slots (13, 14) holding inductively coupled conductors (15, 17). One plate (12) is connected directly to one side of the weld and the other plate (11) is connected via an arm (23) and spacer (24) to the other side of the weld. Multiple slots and conductors can be employed to remove ambiguity from measured signals from the transducer. Multiple transducers can be employed in a scanned X-Y matrix.

4 Claims, 5 Drawing Figures 4,493,214

1

TRANSDUCERS FOR PROVIDING AN ELECTRICAL SIGNAL REPRESENTATIVE OF PHYSICAL MOVEMENT

BACKGROUND OF THE INVENTION

This invention relates to transducers for providing an electrical signal representative of physical movement. The invention has application to the monitoring of mechanical displacement in the hostile environment of sodium-cooled nuclear reactors.

Progress in the design of sodium-cooled nuclear reactors is taking place alongside an increasing demand for added safety. One important element of safety is measurement of performance under operating conditions. Without special care, the mere provision of more and more pieces of apparatus to give more and more measurements can be self defeating because of complexity and the added risk of faults and errors multiplying to create even worse problems.

SUMMARY OF THE INVENTION

The present invention provides a transducer suitable for measuring weld reliability in sodium-cooled nuclear reactors. The transducer is simple, robust, reliable, inexpensive and suitable for use in X-Y matrix systems.

The transducer according to the present invention comprises a first support for supporting a first conductor of a first electrical circuit alongside a second conductor of a second electrical circuit in a second support so that inductive coupling exists between the conductors and so that the two supports can move relative to each other to change the spacing between the conductors characterised in that said supports are in the form of two plates in sliding face contact with parallel slots for the conductors in the contact faces of the plates.

DESCRIPTION OF THE DRAWINGS

The invention will now be described further with reference to the accompanying drawings in which.

DESCRIPTION OF THE INVENTION

Figure 1:
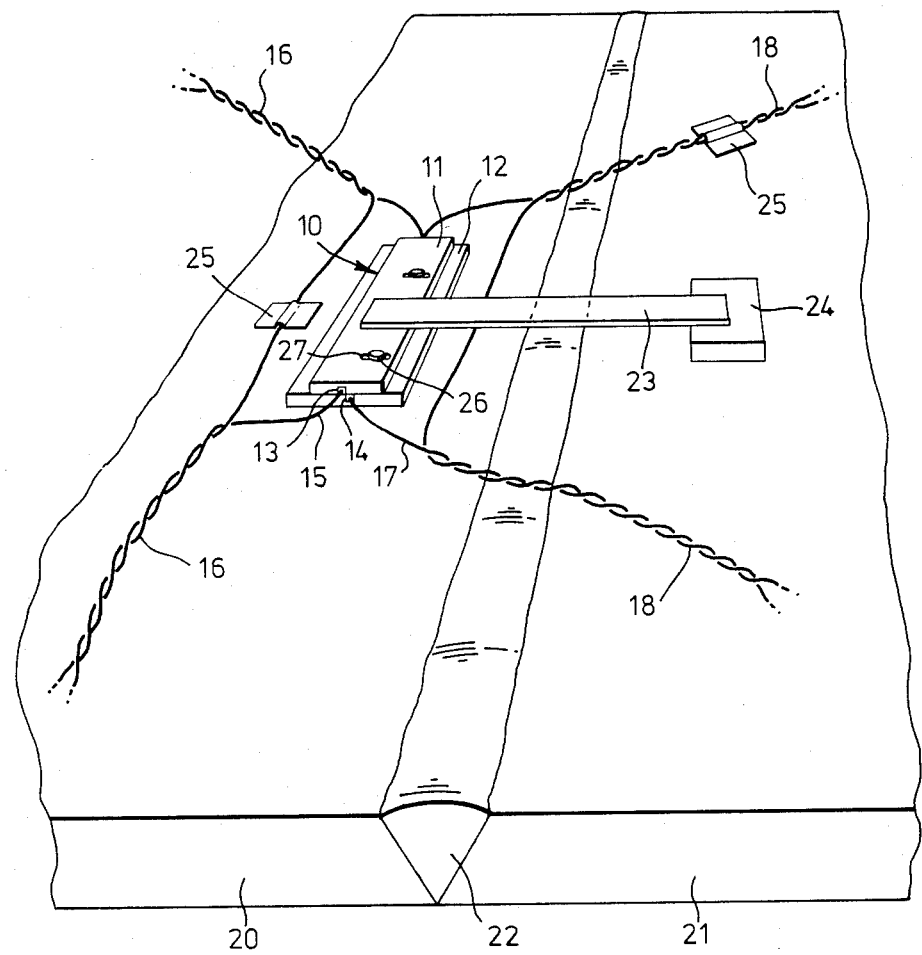
FIG. 1 shows, in perspective, an elementary transducer according to the invention mounted to monitor the condition of a weld.

In FIG. 1 a transducer 10 has an upper plate 11 and a lower plate 12 in sliding face contact. The upper plate has a slot 13 on its sliding face and the lower plate has a slot 14. The slots 13, 14 are parallel. The slot 13 locates firmly a first mineral-insulated conductor 15 which is a part of a first electrical circuit which comprises a paired cable 16, the two conductors of which run in close contact, except at the transducer 10 where they are apart. The slot 14 locates firmly a second mineral-insulate conductor 17 which is a part of a second electrical circuit which comprises a paired cable 18, the two conductors of which run in close contact except at the transducer 10 where they are apart.

The lower plate 12 is joined directly to one plate 20 of a vessel assembled from a series of plates, like plate 20, welded together. This is illustrated by the plate 20 welded to a plate 21 by a weld 22. The upper plate 11 is joined indirectly to plate 21 by an arm 23 which spans the weld 22 and has its other end joined to a levelling plate 24 which is, in turn, joined to the plate 21. Location bridges 25 for the cables 16, 18 are welded to the plates 20, 21. The plates 11, 12 are held in sliding face contact by capped pillars 26 attached to the lower plate 12 and passing through slots 27 in the upper plate 11.

Figure 2:
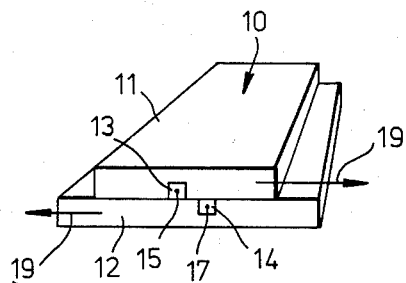
FIG. 2 illustrates the electrical signal derived from the transducer shown in FIG. 1.
Figure 2:
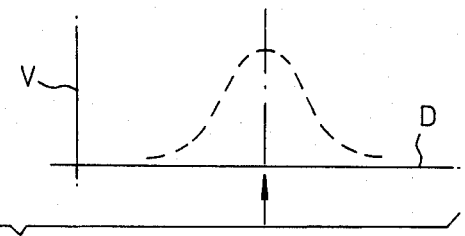

FIG. 2 shows the transducer 10 and, alongside, a graph of the signal (V) derived from the second conductor 17 as it is displaced (D) relative to the first conductor 15 in the slots 13, 14 as the plates 11, 12 move relative to each other as indicated by the arrows 19. The maximum signal is obtained when conductors 15 and 17 are aligned. As they move apart laterally the signal falls. Ambiguity as to direction of movement exists.

Figure 3:
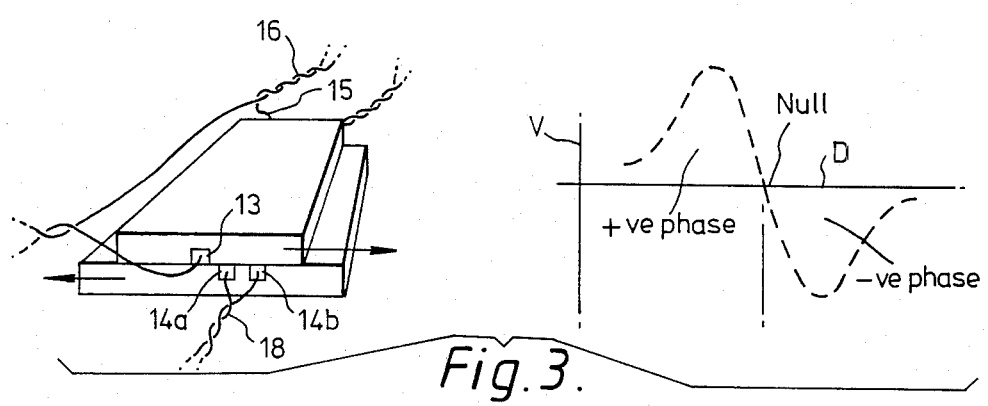
FIGS. 3 and 4 show other forms of transducer according to the invention together with the electrical signals derived therefrom.

In FIG. 3 the ambiguity shown in FIG. 2 is removed by having both conductors of the second circuit 18 in slots 14a and 14b. When slot 13 lies centrally of slots 14a and 14b a null signal is obtained. As slot 13 moves away from this central position a phase-changed output is obtained to remove any ambiguity regarding the displacement.

Figure 4:
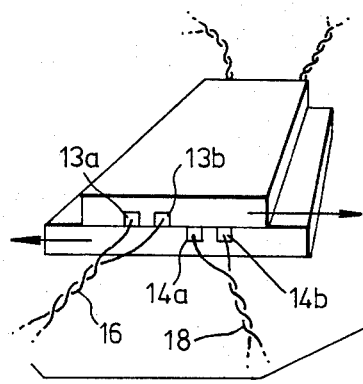
Figure 4:
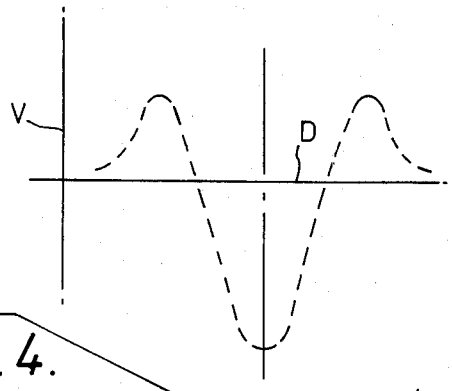

In FIG. 4 both conductors of both the first and second circuits 16, 18 are provided in slots 13a, 13b and 14a, 14b respectively. This generates a large signal when the slots are aligned.

Figure 5:
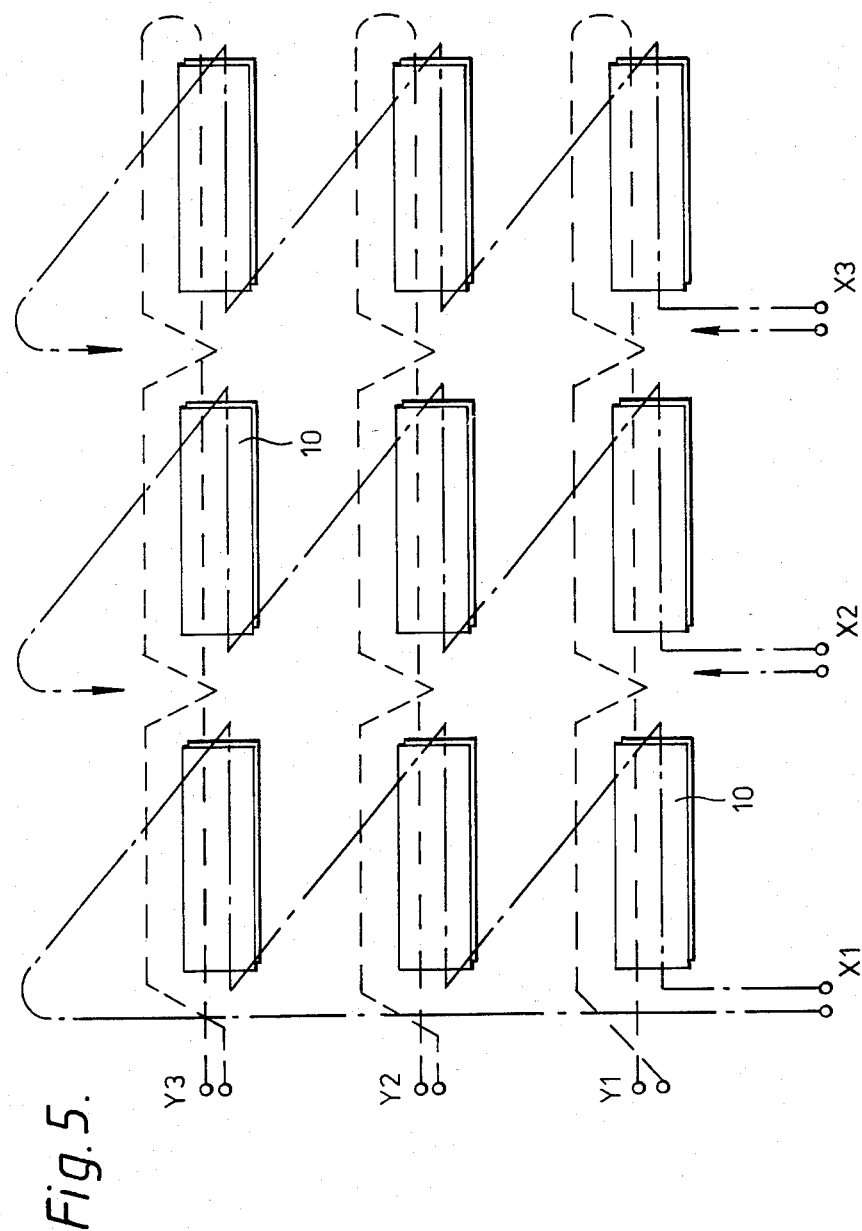
FIG. 5 shows the invention utilised in a matrix system.

In FIG. 5 a series of transducers 10 are arranged at points X1, X2, X3 etc. on the X axis of the matrix and at points Y1, Y2, Y3 etc. on the Y axis of the matrix. First electrical circuits are represented by dot/dash lines and second electrical circuits by dash lines. A typical first circuit (with terminals at the point X1) is seen to pass in series through the transducer 10 at matrix reference X1/Y1, then the transducer at matrix reference X1/Y2, and then the transducer at matrix reference X1/Y3. A typical second circuit (with terminals at the points Y3) is seen to pass in series through the transducers 10 at the matrix references X1/Y3–X2/Y3 and X3/Y3.

By scanning the terminals at X1, X2, X3, etc. and at Y1, Y2, Y3 etc., it is possible to investigate the behaviour of all transducers in the matrix.

A number of design considerations should be kept in mind. The plates 11 and 12 can be of ferritic or non-ferritic material. For strength of signal from the transducer, the former is preferred but where temperatures can rise to those approaching the Curie point of the material of the plates, ferritic material is not preferred. In general, narrow slots and small diameter cable is preferred as this, especially with ferritic plates, increases sensitivity. However, small diameter cable can lack robustness.

Possible adhesion between the plates must also be considered and to aid in this direction the plates may be provided with selected surface coatings or with shims or rubbing pads. Preferably there should be low contact pressures between the plates so that the adhesion problem is not aggravated. However, the pressures should not be so low as to permit the plates to move apart as this could introduce spurious measurements.

I claim:

1. A transducer for providing an electrical signal representative of physical movement comprising a first support (11) for supporting a first mineral insulated conductor (15) of a first electrical circuit (16) alongside a second mineral insulated conductor (17) of a second electrical circuit (18) in a second support (12) so that inductive coupling exists between the conductors and so that the two supports can move relative to each other to change the spacing between the conductors characterised in that said supports are in the form of two plates (11, 12) in sliding face contact with parallel linear slots (13, 14) for the conductors (15, 17) in the contact faces of the plates.

2. A transducer as claimed in claim 1 assembled at the location of a weld (22) with one plate (12) secured directly to one side of the weld and the other plate (11) secured indirectly to the other side of the weld.

3. A transducer as claimed in claim 1 characterised in that the plates have multiple slots (13*a* and 14*a* or 13*a* 13*b* and 14*a*, 14*b*) with conductors in the multiple slots disposed to eliminate ambiguity of direction of movement of the plates.

4. A set of transducers as claimed in claim 1 arranged in a scanned X-Y matrix.

* * * * *